Figure 1:
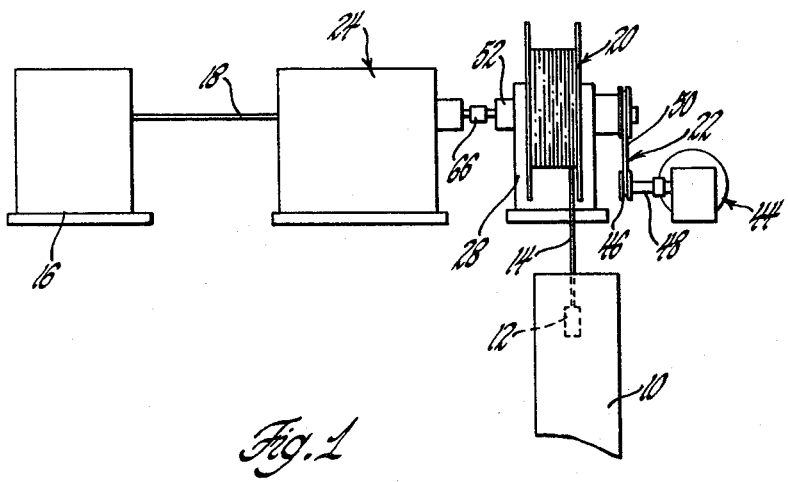

Feb. 16, 1965 L. J. BABACZ 3,169,719
NON-TWISTING ELECTRICAL LEAD WIRE MECHANISM
Filed Jan. 26, 1962 2 Sheets-Sheet 1

INVENTOR.
Lewis J. Babacz
BY
Winnie, Barnard & McGlynn
ATTORNEYS

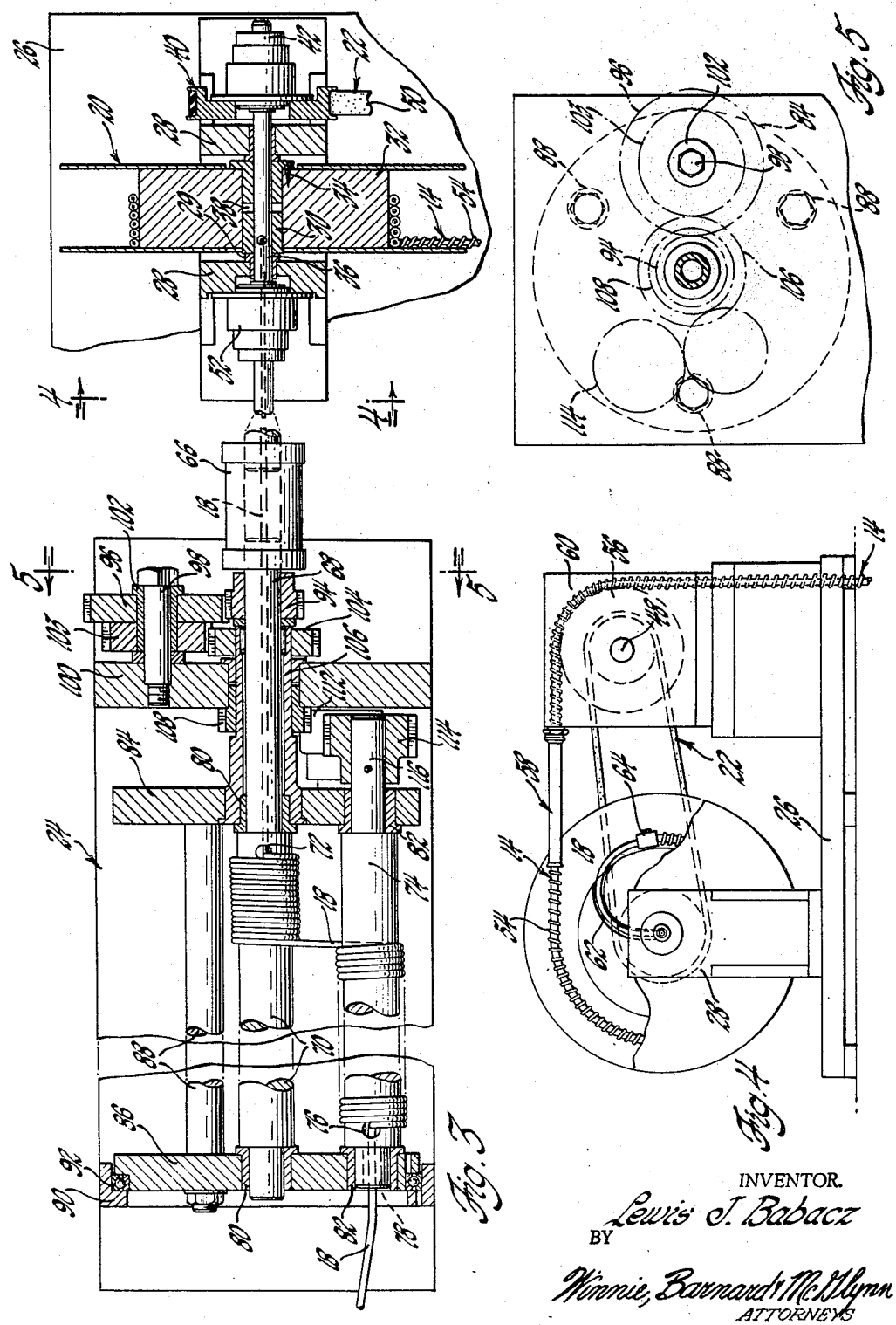

United States Patent Office 3,169,719
Patented Feb. 16, 1965

3,169,719
NON-TWISTING ELECTRICAL LEAD WIRE
MECHANISM
Lewis J. Babacz, Philadelphia, Pa., assignor to Teleflex Incorporated, North Wales, Pa., a corporation of Delaware
Filed Jan. 26, 1962, Ser. No. 169,050
3 Claims. (Cl. 242—54)

The present invention relates to a non-twisting electrical lead wire mechanism. More specifically, the invention relates to a mechanism which enables electrical lead wire to be coiled in a manner which permits a terminal end of the cable to be anchored without twisting of the cable.

While the present invention is of general utility, it is specifically designed for use with electrical lead cable such as that shown in copending application Serial No. 100,833, Kompanek et al., filed April 5, 1961. In certain applications, such cables are adapted to be stored on a reel and fed into and out of devices from which some signal is desired. Typically, such cables may be used in measuring the internal temperatures of furnaces or reactors. In such cases, thermocouples or other heat measuring devices may be suitably attached to one end of the cable to sense temperature while the other end of the cable may be secured to suitable measuring or signaling instruments.

With such measuring systems, it is frequently desired to measure temperature or other conditions at varying places within or to otherwise move the measuring device relative to the installation. Accordingly, it is necessary to provide sufficient length of cable on a storage reel to permit the same to be fed in or out of the installation as required.

It is, of course, necessary to transmit an electrical or other impulse or signal from the cable to suitable measuring means. In general, this is done in either of two ways. One manner of taking off such a signal is to connect the reel-end of the cable to a commutator or slip ring mechanism from which the electrical signal is transmitted to the appropriate instruments for recording or reading.

The use of commutating or similar devices has many disadvantages including exposed electrically conductive surfaces, brushes, slip rings, or the like. Where the cable assembly is to be used in environments where exposed electrical surfaces would create possible fire or explosion hazards, a commutating system cannot be employed. Such a system has the further disadvantage of rubbing or slipping parts which must be periodicaly replaced due to wear. Here again, if the cable installation is in a relatively inaccessible place, or in the case of a reactor, in a relatively hazardous environment, replacement of parts can create a considerable practical problem.

Thus, where a commutating type system cannot be utilized to convey electrical impulses or signals from the measuring cable, it has been the practice to lead the cable directly from the reel to the requisite instrumentation. However, leading such a cable from a rotatable reel to an instrument subjects the cable to considerable twisting in which event the cable components are caused to rub on each other causing considerable wear which may eventualy result in cable or wire failure. Further such movement between current conducting wires may induce false or inaccurate signals.

The subject invention is directed to the latter type installation where commutating members are undesirable and where the signaling cable is directly connected to the measuring or signaling instruments.

In general the present invention relates to a unique mechanism which permits one end of a first portion of the cable assembly to be fixed at one end to a second or reel-mounted portion with the latter being adapted to be fed into the particular installation from which a signal is desired. The other end of the first cable portion is fixed to the appropriate measuring instruments. Said first cable portion coacts with a unique transfer mechanism so as to permit said cable portion to be rotated with the reel without occasioning twisting of the cable during the reel rotation.

The present invention permits such non-twisting of a cable notwithstanding the fact that a portion of the cable may be led from the reel in a direction normal or perpendicular to the reel.

The details as well as other objects and advantages of the present invention will be apparent from a perusal of the detailed description which follows taken in conjunction with the drawings.

Figure 2:
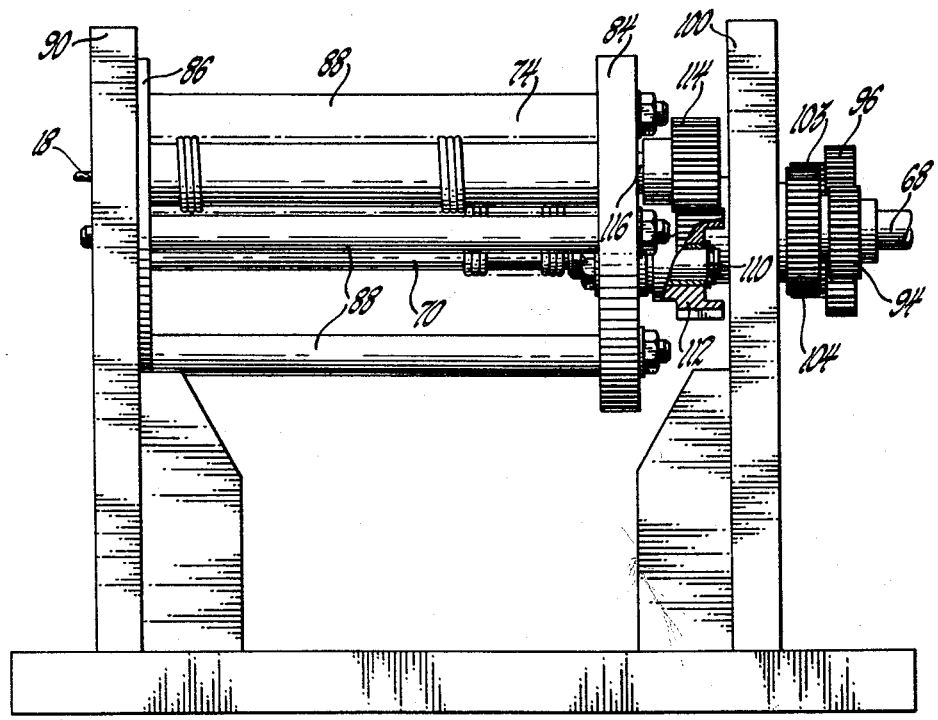

In the drawings:
FIGURE 1 is a diagrammatic view of a cable controlled measuring system embodying the present invention;
FIGURE 2 is an elevational view of the non-twisting cable transfer mechanism;
FIGURE 3 is a sectional plan view showing the cable transfer mechanism connected to the cable storage reel;
FIGURE 4 is a view along line 4—4 of FIGURE 3;
FIGURE 5 is a view along line 5—5 of FIGURE 4.

Referring to FIGURE 1, a heat source or furnace is indicated generally at 10. It is to be understood that heat source 10 may also be an atomic reactor in which it is desired to continuously or intermittently check internal temperatures. It is also within the contemplation of the present invention that internal conditions other than temperature, e.g. radio activity, may also be collected and/or transmitted through the subject mechanism.

For illustrative purposes, it will be assumed that it is desired to measure temperature within heat source 10. Accordingly, a thermocouple device 12 is mounted at the end of a cable 14. As already noted, cable 14 may be of the type shown in copending application S.N. 100,833, Kompanek et al. In any event cable 14 includes an insulated casing within which a plurality of electrical wires are disposed to conduct current to an instrument panel 16 through another cable 18.

Cable 14 is fixed at one end to and coiled about a reel 20. Reel 20 is adapted to be driven by a drive mechanism indicated generally at 22.

Reel 20, in turn, drives a non-twisting cable transfer mechanism 24 through which a determinate length of cable 18 passes to electrically interconnect cable 14 and instrument panel 16.

Thus, thermocouple 12 may be moved into various positions within the heat source 10 by actuating reel 20 and thereby coiling or uncoiling cable 14. At the same time, electrical signals are transmitted through cables 14 and 18 to panel 16 and by virtue of non-twist mechanism 24 twisting of the cable 18 is avoided. In this manner, a direct electrical connection may be maintained between thermocouple 12 and instrument panel 16 without the necessity of using a commutating mechanism and at the same time avoiding twisting of cables 14 and 18.

As seen in FIGURES 3 and 4, reel 20 and drive mechanism 22 are mounted on a common base 26. Reel 20 includes trunnion members 28 which, through journals 29, rotatably support a hollow spool 30 upon which a storage cylinder 32 is mounted. Cylinder 32 is secured to spool 30 through suitable screws 34. A hollow shaft 36 extends through spool 30. A dowel pin 38 drivingly secures shaft 36 to spool 30.

A pulley assembly 40 is adapted to drive shaft 36 through a dual spring clutch device 42. Neither clutch device 42 nor reel driving mechanism 22, per se, constitute a part of the present invention. Suffice it to say that a motor gear device 44 drives a pulley 46 through a shaft 48. Pulley 46, in turn, drives reel pulley assembly 40 through belt 50.

Shaft 36 rotates within a dual spring brake device indicated generally at 52.

As best seen in FIGURES 1, 3 and 4, electrically conductive cable 14 is coiled about reel cylinder 32. In one form cable 14 includes a helical outer wire 54 having longitudinally spaced convolutions which coact with the "toothed" periphery of wheel 56 driven by shaft 48 to positively feed the cable into heat source 10. A swivel assembly 58 is mounted on a support structure 60 to feed cable 14 onto reel 20.

Dual spring clutch and brake devices 42 and 52 are not shown in detail, however, their purpose is to prevent cable 14 from being damaged due to being pulled too hard in either direction.

Pulley assembly 40, belt 50, etc. drive through dual clutch device 42 to coil cable 14 onto reel cylinder 32. If, during the coiling operation the load on cable 14 exceeds a predetermined value, e.g. 35 pounds, device 42 will slip thereby preventing cable damage. During coiling, brake device 52 is merely freewheeling.

Cable 14 is uncoiled by rotation of wheel 56 which drives the cable to move it into heat source 10. Brake device 52 creates a predetermined drag on shaft 36 and hence reel 20 during uncoiling to prevent the reel from overrunning. During uncoiling, clutch device 42 is freewheeling.

An arcuate opening or slot 62 is formed through reel cylinder 32 whereby the inner end of cable 18 is fastened to spool 30. In accordance with the particular needs of the system, a predetermined number of electrically conductive wires are disposed within cable 14 as shown in the aforenoted copending application. The inner end of cable 14 is connected to spool 30 through a suitable electrical connector or terminal 64.

The second lead wire cable 18, having the same number of internal electrically conductive wires as cable 14, extends through radial openings in shaft 36, spool 30 and through arcuate slot 62 and is also secured to electrical connector 64.

Cable 18 extends longitudinally through shaft 36, flexible coupling 66 and also through an axially aligned shaft 68 which is secured to or integral with a cable transfer roll 70 of non-twist mechanism 24. Cable 18 thereafter extends out through a radial opening 72 in transfer roll 70 and is wrapped, in one direction, around the roll through a plurality of convolutions. From transfer roll 70 cable 18 is then wrapped, in the other direction, on a parallel outer transfer roll 74 throughout a good portion of the latter's length after which the cable passes inwardly through a radial hole 76 in the roll and out through an axial passage 78 to connect with the instrument panel or indicating device 16.

Transfer rolls 70 and 74 constitute a part of the non-twisting mechanism 24 the remainder and operation of which will now be described in detail.

The central and outer transfer rolls 70 and 74 are rotatably supported in journal sets 80 and 82 in turn fixed within end cages 84 and 86. End cages 84 and 86 are rigidly secured together through a plurality of stud members 88 suitably bolted therebetween. End cage 86 is rotatably supported in a bracket 90 through a bearing 92. Thus end cages 84 and 86 may rotate and at the same time transfer rolls 70 and 74 may rotate relative to the cages.

A gear 94 is fixed for rotation with transfer roll shaft 68, and in turn meshes with a gear 96 rotatably supported on a spindle 98 secured to support member 100. Gear 96 is secured to a sleeve 102 to which a second gear 103 is also fixed. Gear 103 meshes with an identical sized gear 104 fixed to a sleeve 106 concentrically disposed about and rotatable relative to transfer roll shaft 68. The other end of sleeve 106 is fixed to end cage 84.

Gear 94 has half as many teeth as gear 96, therefore, a 2:1 gear reduction exists between the speed of rotation of transfer roll shaft 68 and end cages 84 and 86. Thus, as transfer roll 70 rotates at the same speed as reel 20, cages 84 and 86 rotate in the same direction but at one-half speed.

A gear 108 concentrically disposed about shaft 68 is fixed to support 100. A spindle 110 is fixed to end cage 84 and rotatably supports a gear member 112 adapted to mesh with fixed gear 108. Therefore, as cage 84 rotates, idler gear 112 planetates about fixed gear 108. Another gear 114, having the same number of teeth as gear 112, is fixed to shaft 116 of outer transfer roll 74. Thus, rotation of cage 84 causes outer transfer roll 74 to revolve relative to both support 100 and its own longitudinal axis. The rotation of transfer roll 74 about its own axis is opposite to that of central transfer roll 70, although the angular velocities of the roll are always equal.

Since the central transfer roll 70 is connected directly to storage reel 20, the flexible lead wire cable 18 connected at one end to the storage reel spool 30 and mounted on the transfer roll revolves in a direct relationship to them as the cable 14 is paid out from or is wound on storage reel 20.

Each revolution of the storage reel 20 revolves central transfer roll 70 one revolution which would normally unwrap one turn of flexible lead cable 18 from the central transfer roll. However, since the end cage assembly 84–86 is also turning in the same direction at one-half the speed of the central transfer roll, it will have turned one-half a turn which will cause one-half turn of the flexible lead wire 18 to be rewrapped on the central transfer roll and one-half turn wrapped on outer transfer roll 74. Thus, the amount of flexible lead wire 18 which is unwrapped from central transfer roll 70 is balanced by one-half of the turn being rewrapped on roll 70 and the other half turn being wrapped on the oppositely rotating adjacent transfer roll 74. Since the outer transfer roll 74 is rotating oppositely relative to roll 70 and is also being circularly translated thereabout, the flexible electric lead cable 18 emerging from the center of the outer transfer roll 74 can be directly fastened to instrument or panel 16 without cable twisting or wind-up. In other words, rotation of cable 18 is accommodated by uncoiling and coiling the cable between transfer rolls 70 and 74 without twisting the cable as has occurred in the past.

The number of turns of cable 14 which is wound on the storage reel 20 as well as the diameter and flexibility of the electrical lead cable 18 which is wrapped on the transfer rolls determine the length and diameter of transfer mechanism 24. One-half wrap of flexible electrical lead wire 18 on the transfer rolls 70 and 74 is equal to one wrap of cable 14 on storage reel 20. Therefore, one-half the number of turns of cable 14 wrapped on the storage reel 20 times the diameter of the flexible lead cable 18 equals the minimum length required between holes 72 and 76 leading to the center of transfer rolls 70 and 74.

The minimum bend radius of electrical lead wire 18 determines the minimum diameters of the transfer rolls 70 and 74 and cages 84–86.

The length and diameter of the overall mechanism can be built within practical limits to accommodate varying amounts of cable from miniature sizes for instrumentation to giant sizes for heavy equipment. In summary, there is no practical limit to length of cable which may be used, storage reel 20 can be of any diameter, width or capacity. Also the storage reel is interchangeable with other size reels.

It is within the contemplation of the invention that cables 14 and 18 could be combined as a single cable. The two cable arrangement illustrated merely shows a particular variation in which one type of cable, with a helical wire formed about the casing, is utilized to facilitate cable actuation relative to the heat source.

Some cables tend not to wind evenly on the transfer rolls 70 and 74, in such case, the rolls may include peripheral grooves or threads, not shown, in which the cable may fit. The thread or groove would correspond in radial size to the particular size cable being wound. Also, the helices of the respective rolls would be reversed in the manner of the cable convolutions shown in FIGURE 3. Such threads or grooves would thus eliminate uneven winds and the likelihood of cable stretch.

It is apparent that various structural modifications may be made in the inventive concept of the subject invention as illustrated and within the intended scope of the invention as set forth in the hereinafter appended claims.

I claim:

1. A non-twisting cable coiling mechanism comprising a storage reel, a hollow shaft, said reel being fixed to said shaft for rotation therewith, cable means adapted to be coiled about said reel, one end of said cable means being adapted to extend radially inwardly of said reel into said hollow shaft, said one end of the cable means being extended longitudinally through said hollow shaft, a cable transfer mechanism including a first transfer roll operatively connected to said reel shaft for rotation therewith, one end of said transfer roll being rotatably supported in a first end cage, the other end of said transfer roll being rotatably supported within a second end cage, a rigid support member, said first end cage being rotatably supported within said support member, longitudinally extending stud means for rigidly securing together said first and second end cages, a second transfer roll secured between said end cages and rotatable relatively thereto, said second transfer roll being disposed radially outwardly from said first transfer roll and being parallel thereto, an axial passage formed within said first transfer roll and axially aligned with said hollow reel shaft, said cable means being adapted to extend through said hollow reel shaft into the axial passage of the first transfer roll, a radial passage formed through said first transfer roll and communicating with said axial passage, said radial passage being disposed proximate one of said end cages, an axial passage formed in the second transfer roll, a second radial passage communicating with the axial passage of said second transfer roll, said second radial passage being disposed proximate the other of said end cages, said cable means passing through said first radial passage and being closely coiled about the associated transfer roll, said cable means extending from said first transfer roll to said second transfer roll and being closely coiled about the latter, said cable means passing within said second radial passage and axially out of the axial passage of said second transfer roll, gear reduction means driven by said reel shaft for rotating said end cages in the same direction as but at one-half of the speed of said reel shaft, and additional gear means for rotating said second transfer roll relative to said end cages whereby one revolution of said first transfer roll will transfer a portion of said cable means from said first transfer roll to said second transfer roll without imparting any twisting thereof, said transfer roll being constructed and arranged so that the angular velocities of the cable means receiving periphery thereof are always equal.

2. A cable storage mechanism comprising a reel, cable means adapted to be coiled about said reel, one end of said cable means being free, said reel including a hollow hub member rotating therewith, the other end of said cable means extending within said hub and passing axially therefrom and being fixed against rotation at points remote from said reel, and a cable transfer mechanism supporting that portion of the cable means intermediate said reel and the fixed end of said cable means whereby twisting of said cable means about its longitudinal axis is substantially prevented, said cable transfer mechanism comprising a pair of rotatable and longitudinally spaced end cage members, stud means rigidly connecting said end cage members, a first roll member rotatably mounted between said end cage members and concentric with the axis of rotation of said members and having an axial passage which terminates in a radial opening proximate one end cage member, a second transfer roll offset from and parallel to the first roll member and having an axial passage which terminates at one end in a radial opening, said second roll also supported between said end cage members and relatively rotatable thereto, said first transfer roll means operatively connected to and coaxially aligned with said reel, that portion of the cable means between the reel hub and the fixed end being reversely coiled about the respective rolls such that reel rotation will cause a partial transfer of said cable means between said rolls, said cable means portion extending through said axial passage in said first roll and out the radial opening therein to be closely coiled in a single layer about said first roll for a portion of its length, said cable means portion passing from said first roll to said second roll where it is closely coiled thereabout in a single layer over a portion of its length, the final coil convolution on said second roll terminating proximate the radial opening therein with the cable means extending within said opening and out through the axial passage of said second roll, said first and second transfer rolls being constructed and arranged so that the angular velocity of the cable means receiving peripheries thereof are always equal.

3. A cable storage mechanism as set forth in claim 2 in which the cable means coil on the first roll begins proximate one end cage member and terminates intermediate the end cage members, the cable means coil on the second roll begins intermediate the end cage members and terminates proximate the other end cage member.

References Cited in the file of this patent

UNITED STATES PATENTS

| | | |
|---|---|---|
| 2,165,259 | Helm | July 11, 1939 |
| 2,496,785 | Finneburgh et al. | Feb. 7, 1950 |
| 2,605,977 | Gleason | Aug. 5, 1952 |
| 2,629,027 | Piatt | Feb. 17, 1953 |
| 2,862,673 | Smaltz | Dec. 2, 1958 |
| 2,872,130 | Nardone | Feb. 3, 1959 |